(No Model.)
J. BLISS.
COMPENSATION BALANCE FOR TIMEPIECES.
No. 492,184. Patented Feb. 21, 1893.
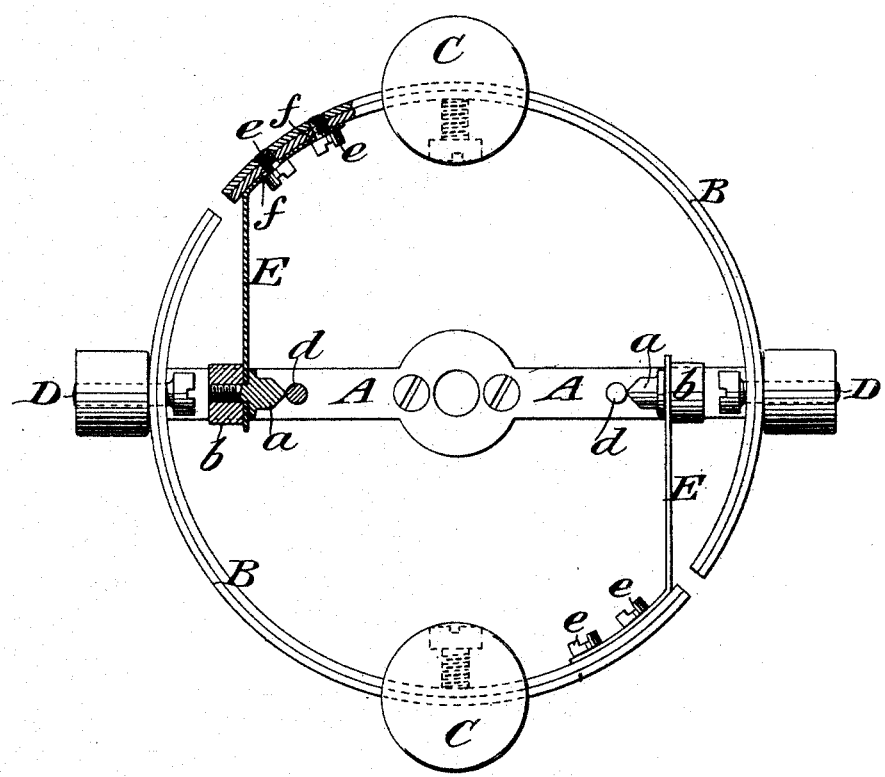
Witnesses:
C. F. Sundgren
D. H. Haywood
Inventor:
John Bliss
by attorneys
Brown & Seward

UNITED STATES PATENT OFFICE.

JOHN BLISS, OF BROOKLYN, ASSIGNOR TO JOHN BLISS & CO., OF NEW YORK, N. Y.

COMPENSATION-BALANCE FOR TIMEPIECES.

SPECIFICATION forming part of Letters Patent No. 492,184, dated February 21, 1893.

Application filed June 1, 1892. Serial No. 435,166. (No model.)

*To all whom it may concern:*

Be it known that I, JOHN BLISS, of Brooklyn, in the county of Kings and State of New York, have invented a new and useful Improvement in Compensation-Balances for Chronometers and other Timepieces, of which the following is a specification.

When time pieces, such as marine chronometers and watches are fitted with the ordinary form of compensation balance, viz: arms attached to the balance staff, carrying at their outer ends laminated rims of different metals on which rims are fastened the compensation weights it is found the balance weights may be so adjusted that the daily rate of going will be practically the same in any two extreme temperatures, say 30° and 90° Fahrenheit. For ordinary watches and where strict accuracy is not necessary it is assumed the daily rate is the same in all other temperatures. But it is well known that in the intermediate temperature of 70°, the daily rate will be faster by a quantity that varies in different chronometers from about two seconds to four seconds per day. This error, called the intermediate or secondary error, is one which occasions great inconvenience where it is desired to accurately carry forward time for lengthened periods, whether mean time for the purposes of navagation or standard time for civil affairs or siderial time for astronomical purposes. This difficulty is usually met either by applying to the accumulated error of the chronometer a daily correction made up of the rate in the mean temperature and the error from that rate due to the mean temperature of each day, or by applying some kind of auxiliary compensation for the purpose of overcoming the secondary error.

Many of the various forms of auxiliary compensation are highly objectionable for the reason that they are complicated and expensive, do not retain their adjustment, add too much unnecessary weight to the balance, are unstable and often produce worse errors than they are intended to counteract.

The object of the present invention is to obtain a device for effecting the compensation for the secondary error which is less complicated and expensive, more easily adjusted, less liable to get out of adjustment and more reliable in its action than the means heretofore employed for the purpose.

I have said that the daily rate of a chronometer with an ordinary balance is faster in the intermediate temperature than in the extremes 30° and 90°. Conversely, if the chronometer be regulated to go at mean time in 70° it will lose in any temperature higher or lower than 70°. What is needed then is that something shall counteract this natural tendency to go slower with a rise or fall of temperature.

I will proceed to describe my invention with reference to the accompanying drawing which represents on a scale considerably larger than the real size, a plan view of a chronometer balance to which the invention is applied.

A A are the arms of the balance and B B are the two members into which the laminated rim is divided, one of said members being attached near one end to each arm. Each of said members has adjustably secured upon it one of the compensation weights C C, and each has also fitted to it one of the timing screws D D. The parts so far described are common.

To provide for the auxiliary compensation for the secondary error I attach to the inner face of either or each member of the laminated rim near its free end one end of a thin spring E of steel or other elastic material which is bent to reach over the unoccupied part of the arm which carries the other member of the rim, and to the free end of said spring so reaching over the arm I attach a small weight $a\,b$, the inner end or face of which presented toward the axis of the balance is tapered to an edge or rounded or pointed to bear against a small pin $d$ of hardened steel or any other suitably hard material standing on the arm perpendicular to the plane of the balance. The said weight $a\,b$ is kept in contact with the pin $d$ by the spring E with sufficient force of the spring to overcome any tendency of the centrifugal force when in motion to cause any separation of the said weight and the pin. When the said weight and the pin are of the right weight and diameter respectively, which are found by experiment and the point of the said weight is adjusted so that at the temperature of 70° it will rest on that portion of the pin farthest from the center of the balance, then any movement inward or outward of the laminated rim will permit the said weight to move toward the center of the balance and cause the balance to move faster just enough to counteract the loss by reason of the secondary error.

The spring E is represented as attached to the laminated rim by means of screws $e\ e$ and the attached part is represented as provided with slots $f\ f$ through which the fastening screws $e\ e$ pass into the rim to provide a means of adjusting the point or edge of the weight $a\ b$ on the pin. This is shown at the right hand side of the drawing where the spring E and weight $a\ b$ and part of the laminated rim are shown in section. It is obvious however, that the pin $d$ might be made adjustable across the balance arm for the same purpose.

The weight $a\ b$ may be constructed with its sharp-edged, pointed or rounded face in any suitable manner. It is represented as consisting of a screw $a$ and nut $b$, the screw passing through the spring E and secured by the nut, the head of the screw being toward the axis of the balance and having the sharp-edged, pointed or rounded face which impinges upon the pin $d$. The pin $d$ may be attached to the laminated rim B and the spring E to the arm A or the adjoining rim B.

What I claim as my invention, and desire to secure by Letters Patent, is—

The combination with a balance having a divided laminated rim, of a weight, a spring by which said weight is attached to the said rim and forced toward the axis of the balance, and a pin carried by one of the arms of the balance to sustain said weight against the force of the said spring, substantially as and for the purpose herein set forth.

JOHN BLISS.

Witnesses:
    CHAS. A. HAVILAND,
    C. AUGUSTUS HAVILAND.